United States Patent
Corbett et al.

(10) Patent No.: US 7,220,010 B2
(45) Date of Patent: May 22, 2007

(54) EMERGENCY LIGHT

(75) Inventors: Brian A. Corbett, Warwick, MD (US);
Sean P. Collins, Peabody, MA (US)

(73) Assignee: EgressLite, LLC, Middletown, DE (US)

( * ) Notice: Subject to any disclaimer, the term of this patent is extended or adjusted under 35 U.S.C. 154(b) by 150 days.

(21) Appl. No.: 11/083,246

(22) Filed: Mar. 16, 2005

(65) Prior Publication Data

US 2006/0133096 A1 Jun. 22, 2006

Related U.S. Application Data

(60) Provisional application No. 60/554,029, filed on Mar. 16, 2004.

(51) Int. Cl.
*F21V 19/04* (2006.01)

(52) U.S. Cl. .................. 362/20; 362/250; 362/286; 362/289; 362/364; 340/333

(58) Field of Classification Search ............ 362/20, 362/233, 250, 251, 286, 289, 364, 385, 386; 315/86; 340/333
See application file for complete search history.

(56) References Cited

U.S. PATENT DOCUMENTS

| | | | |
|---|---|---|---|
| 2,198,077 A | 4/1940 | Curtis | |
| 4,708,223 A | 11/1987 | Orndorff et al. | |
| 4,802,065 A | 1/1989 | Minter et al. | |
| 5,124,902 A | 6/1992 | Puglisi | |
| 5,130,916 A | 7/1992 | Toth | |
| 5,142,463 A | 8/1992 | Panagotacos et al. | |
| 5,628,558 A | 5/1997 | Iacono et al. | |
| 5,851,061 A | 12/1998 | Hegarty | |
| 6,164,788 A | 12/2000 | Gemmell et al. | |
| 6,371,621 B1 | 4/2002 | Le Bel | |
| 6,538,568 B2 * | 3/2003 | Conley, III | 315/86 |
| 2003/0048626 A1 * | 3/2003 | Johler et al. | 362/20 |

* cited by examiner

*Primary Examiner*—Stephen F Husar
(74) *Attorney, Agent, or Firm*—O'Connell Law Firm

(57) ABSTRACT

An emergency light for providing illumination during emergency conditions with a housing, a light source, and a drive arrangement for driving the light source between retracted and extended positions. Flanges, which can be removable, can project from the housing. Fastening arrangements each comprising a mounting bolt in combination with a locking clip can retain the emergency light in relation to a support surface. A motor in combination with a drive screw threadedly engaged with the light source can form the drive arrangement to produce an axial movement of the light source. A limit switch can sense a position of the light source, and a reflector can guide light from the light source. An emergency condition sensor can trigger an extension and illumination of the light source. A battery can power the light during a power failure. Plural lights and a central control unit can form an emergency lighting arrangement.

22 Claims, 5 Drawing Sheets

EMERGENCY LIGHT

FIELD OF THE INVENTION

The present invention relates generally to lighting devices. More particularly, disclosed herein is an extendable and retractable emergency light for mounting relative to a support surface to provide lighting during emergency conditions while remaining substantially concealed during non-emergency conditions.

BACKGROUND OF THE INVENTION

The prior art has disclosed a plurality of emergency lights. Many such lights are founded on bulky, box-like body portions that fixedly project from a support surface. As such, the devices are constantly exposed. The exposed lights are indiscreet and often aesthetically displeasing and difficult to blend with surrounding decor.

Other emergency lights have been disclosed that pivot between extended and retracted positions by operation of a pivoting door arrangement. While such devices achieve a measure of concealment during non-emergency conditions, it has been found that the pivoting door arrangement can swing open in a manner so violent as to damage and cause failure of system components, most commonly the bulbs of the lighting device.

In light of the foregoing summary of the state of the art, it will be appreciated that there is a substantial need for an emergency light that overcomes one or more disadvantages or shortcomings of the prior art. Of course, an emergency light solving the disadvantages and shortcomings demonstrated by the prior art while providing further advantages thereover would represent a marked advance in the art.

SUMMARY OF THE INVENTION

Advantageously, the present invention is founded on the basic object of providing an emergency light that overcomes the disadvantages of the prior art while providing a plurality of further advantages thereover.

A further object of certain embodiments of the invention is to provide an emergency light that can be extended from a support surface to provide emergency lighting to building occupants during emergency conditions.

Another object of embodiments of the invention is to provide an emergency light that can be retracted to a generally concealed position during non-emergency conditions.

A related object of the invention is to provide an emergency light that is effective in operation while remaining aesthetically pleasing.

These and further objects and advantages of embodiments of the invention will become obvious not only to one who reviews the present specification and drawings but also to one who has an opportunity to make use of an embodiment of the instant invention for an extendable and retractable emergency light. However, it will be appreciated that, although the accomplishment of each of the foregoing objects in a single embodiment of the invention may be possible and indeed preferred, not all embodiments will seek or need to accomplish each and every potential object and advantage. Nonetheless, all such embodiments should be considered within the scope of the present invention.

In carrying forth these objects, a basic embodiment of the present invention comprises an emergency light for providing illumination during emergency conditions. The emergency light can be founded on a housing that has an open inner volume. A light source can be retained relative to the housing, and a drive arrangement can be provided for driving the light source between a retracted position at least partially disposed within the open inner volume of the housing and an extended position wherein the light source projects at least partially from the housing.

In certain embodiments, the housing can be substantially rectangular in cross section with a first end wall, a second end wall opposite the first end wall, a first sidewall, a second sidewall opposite the first sidewall, and a bottom wall. The bottom wall can form a rear portion of the housing while a front portion of the housing can be selectively closed by a cover plate. One or more flanges can project from the front portion of the housing and, in certain cases, can be removable and replaceable in relation to the housing.

At least one fastening arrangement can be operably associated with the housing for retaining the emergency light in relation to a support surface. In one example, the fastening arrangement can take the form of a mounting bolt in combination with a locking clip. A proximal end of each of the mounting bolt and the locking clip can be retained adjacent to the front portion of the housing, and a distal portion of the mounting bolt can be threadedly engaged with a distal portion of the locking clip. With this, a rotation of the mounting bolt will tend to draw the distal portion of the locking clip toward the proximal portion of the locking clip thereby bending the same and causing the locking clip to retain the emergency light in relation to the support surface.

The drive arrangement can comprise a motor in combination with a drive screw, and the light source can comprise a body portion with at least one lamp retained relative to the body portion. The light source can have a lens coupled to the body portion thereof to define an open inner volume. The lamp or lamps can be disposed within that open inner volume. Additionally, a reflector with a mirrored portion can be retained relative to the light source for directing light emitted by the at least one lamp.

The drive screw can be threadedly engaged with the body portion of the light source such that a rotation of the drive screw by the motor will induce an axial movement of the light source between extended and retracted positions. Embodiments of the emergency light can incorporate a limit switch for sensing a relative disposition of the light source and for enabling a control of motor and lamp function based thereon.

A control circuit, which can be disposed within the housing, can be operably associated with the motor and the light source for controlling an operation of the motor and an illumination of the light source. Additionally, a backup battery, which also can be disposed within the housing, can be electrically associated with the control circuit, the motor, and the light source. A means can be provided for electrically coupling the emergency light to an external power source, and the control circuit can induce an extension of the light source in response to a failure in the external power source and a retraction of the light source in response to a return of power from the external power source. In certain constructions, an emergency condition sensor, such as a smoke or carbon monoxide detector, can be operably associated with the light source and the drive arrangement, and a means can be employed for triggering an extension and illumination of the light source in response to a sensed emergency condition. An indicator light can provide an indication of a functional status of the emergency light, and a test button can induce a self-testing of the emergency light.

A plurality of emergency lights can be mounted in relation to various support surfaces of a building structure to form an emergency lighting arrangement for providing illumination during emergency conditions Again, each emergency light can have a housing, a light source retained relative to the housing, and a drive arrangement for driving the light source between retracted and extended positions. A central control with a control circuit can be disposed in communication with each of the emergency lights by, for example, a wiring arrangement or a wireless arrangement. Where a wiring arrangement is employed, it can additionally function to transmit power from the central control unit to each of the emergency lights. A backup battery can be disposed in electrical association with the central control unit for providing emergency power to the emergency lighting arrangement.

One will appreciate that the foregoing discussion broadly outlines the more important features of the invention to enable a better understanding of the detailed description that follows and to instill a better appreciation of the inventors' contribution to the art. Before any particular embodiment or aspect thereof is explained in detail, it must be made clear that the following details of construction, descriptions of hardware and software designs, and illustrations of inventive concepts are mere examples of the many possible manifestations of the invention.

BRIEF DESCRIPTION OF THE DRAWINGS

Various other objects, features, and attendant advantages of the present invention will become fully appreciated in view of the present specification and the accompanying drawings, in which like reference characters designate the same or similar parts throughout the several views, and wherein.

DETAILED DESCRIPTION OF PREFERRED EMBODIMENTS

As is the case with many inventions, the present invention for an extendable and retractable emergency light is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 6:
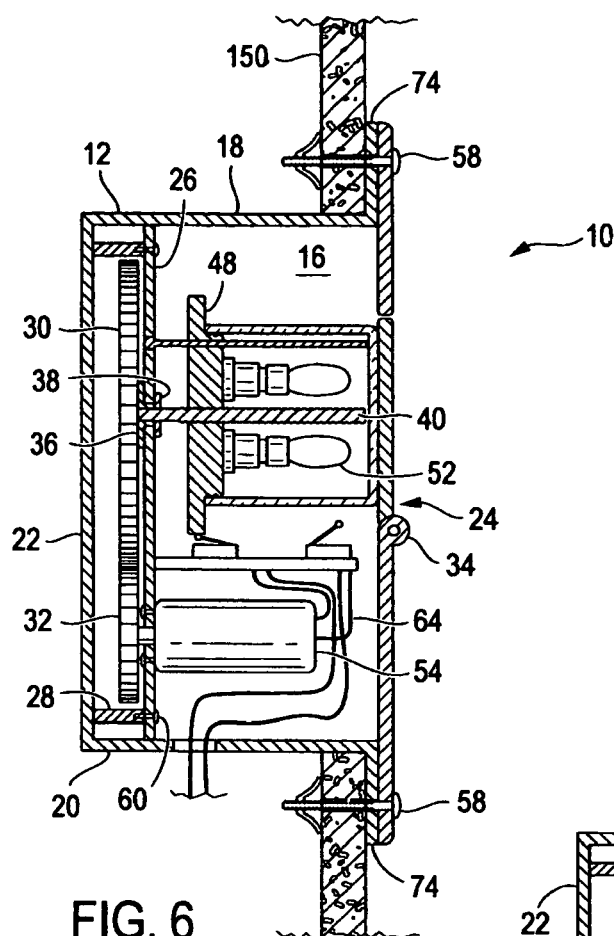
FIG. 6 is a cross sectional view in side elevation of a retractable emergency light pursuant to the instant invention in a retracted disposition.
Figure 7:
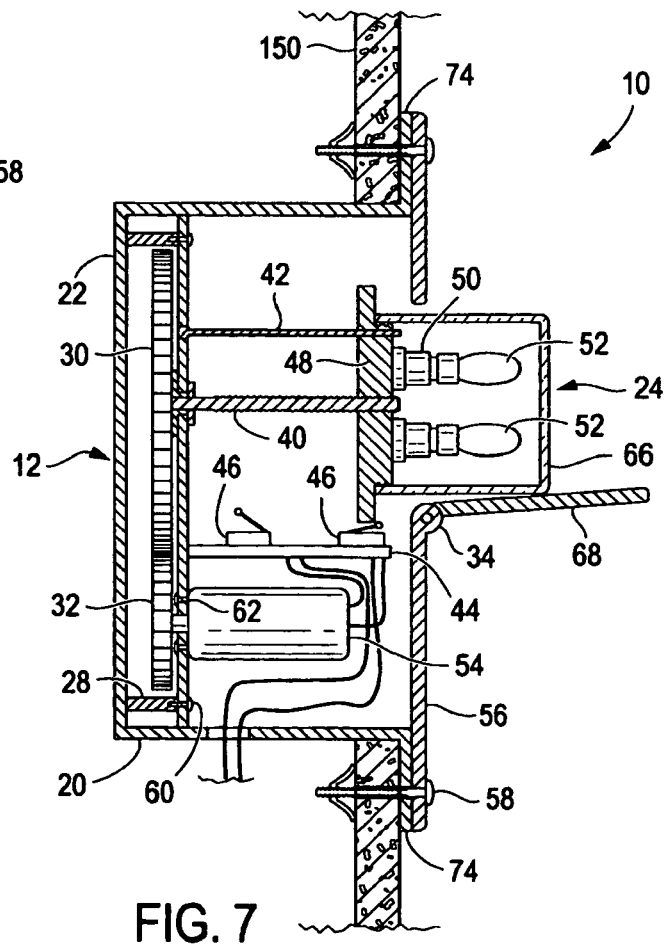
FIG. 7 is a cross sectional view in side elevation of the retractable emergency light of FIG. 6 in an extended disposition.

With this in mind and looking more particularly to the accompanying drawings, exemplary embodiments of an extendable and retractable emergency light pursuant to the present invention are indicated generally at 10 in FIGS. 1 through 7. The emergency light 10 is founded on a housing 12, which in this example is generally rectangular in cross section with a boxlike open inner volume. The open inner volume of the housing 12 is defined by a first end wall 18, a second end wall 20, a first sidewall 14, a second sidewall 16, and a bottom wall 22. As FIGS. 6 and 7 show, a false bottom plate 26 is retained in spaced relation relative to the bottom wall 22 by standoff rods 28 with standoff screws 60 while the opposing portion of the housing 12 can comprise an open face.

Figure 9:
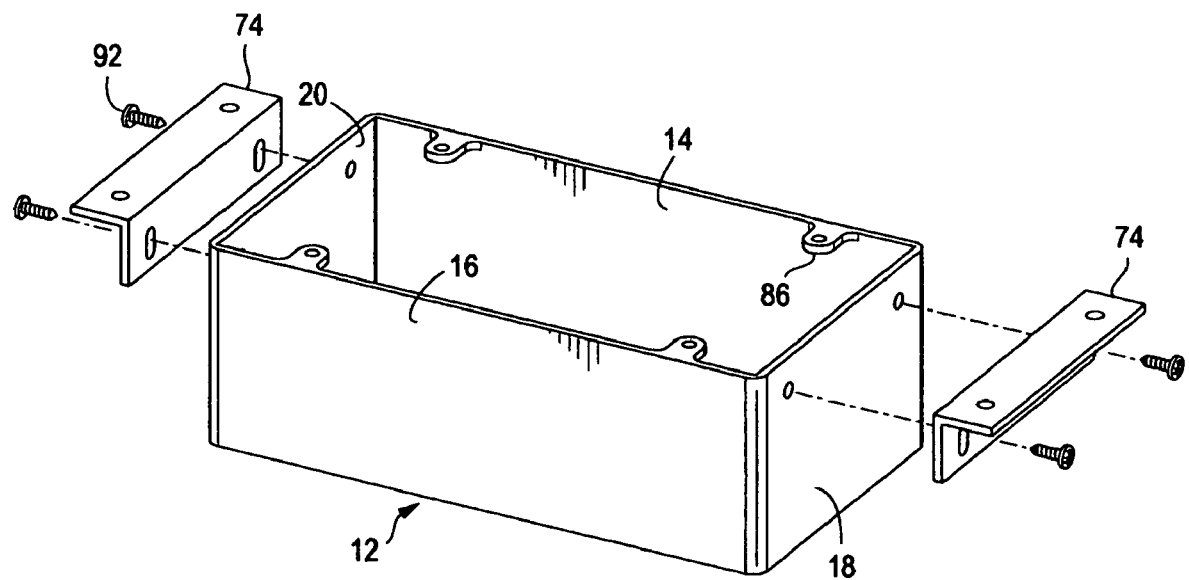
FIG. 9 is a perspective view of an emergency light housing under the invention disclosed herein.

First and second flanges 74 can extend from the first and second end walls 18 and 20 for enabling a mounting of the emergency light 10 relative to a support surface: 150. The first and second flanges 74 can be integrally formed with the housing 12. Alternatively, the flanges 74 can be fixed to the first and second end walls 18 and 20 by any effective means. For example, as is shown in FIG. 9, the first and second flanges 74 can be removably coupled to the first and second end walls 18 and 20 by a fastening means, such as the threaded fasteners 92 depicted in FIG. 9. With this, the emergency light 10 can be retained relative to a support surface 150 relying at least in part on the flanges 74 as in what is commonly referred to as an old work situation. Alternatively, where the framing of a support surface 150 is exposed as in a new work situation, the housing 12 of the emergency light 10 can be fixed directly to the framing, likely with the flanges 74 entirely removed.

Figure 8:
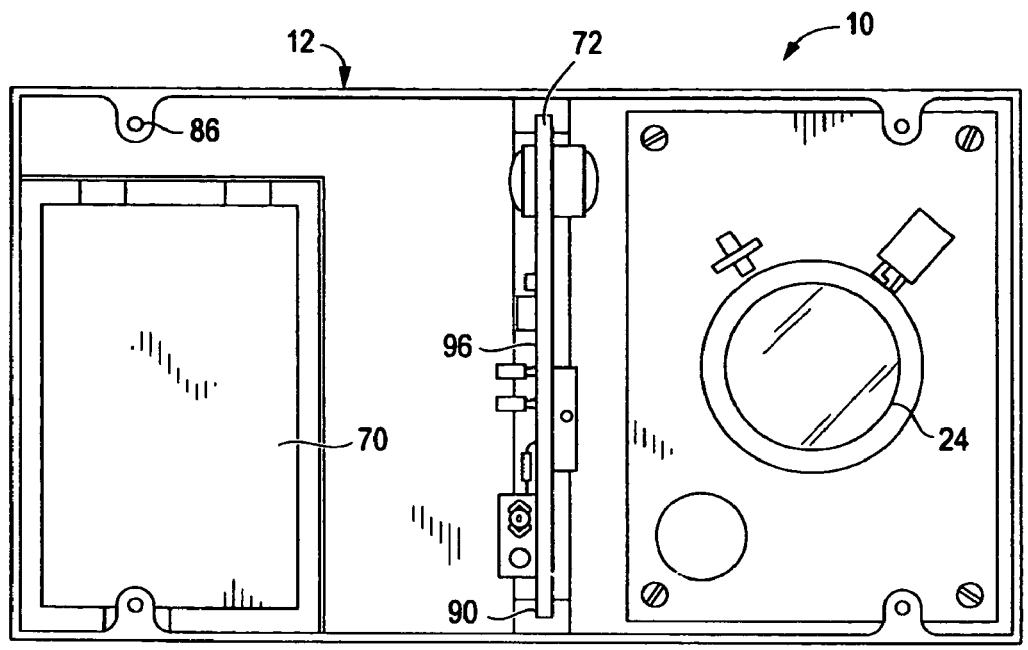
FIG. 8 is a view in front elevation of an embodiment of the present invention for a retractable emergency light with the cover plate removed.

The support surface 150 can comprise a wall surface, a ceiling surface, or any other possible support surface. A cover plate 56 can overlie the housing 12 to substantially enclose the open inner volume thereof. Fasteners 58 can secure the cover plate 56 to the housing 12, such as by use of threaded tabs 86 as shown in FIG. 8. The same fasteners 58 could be employed to retain the housing 12 and the retractable emergency light 10 in general relative to the support surface 150 in a substantially flush relationship.

Alternatively, as one can perceive by combined reference to FIGS. 1 through 5, the emergency light 10 can be secured in relation to a support surface 150 by a plurality of fastening arrangements each comprising a mounting bolt 82 in combination with a locking clip 80. The proximal ends of the mounting bolts 82 and the locking clips 80 can be retained adjacent to the open face of the housing 12 by retaining ears 81. The distal ends of the mounting bolts 82 and the locking clips 80 can be threadedly engaged with one another. Each locking clip 80 can have a pre-locking configuration that is slightly bowed outwardly.

Under this arrangement, the emergency light 10 can be secured in relation to a support surface 150, such as a portion of a wall or ceiling, by an insertion of the housing 12 through the support surface 150 and then an activation of the fastening arrangement by a rotation of the mounting bolts 82 thereby to draw the distal ends of the locking clips 80 toward the proximal ends thereof. As the distal ends of the locking clips 80 are drawn toward the proximal ends thereof, the body portions of the locking clips 80 will be pressed outwardly thereby compressing the adjacent portion of the support surface 150 between the locking clips 80 and the flange portions 70. With this, the emergency light 10 will be secured in place.

The retractable emergency light 10 can be rendered substantially concealed relative to the support surface 150 when the lens 66 of the light source 24 is in a retracted position as, for example, in FIG. 6. Again, the housing 12 can be mounted in a freestanding position in a wall or ceiling support surface 150, or it can be secured directly to framing (not shown) within the wall or ceiling support surface 150. A lens cover 68 can be hingedly retained relative to the cover plate 56 by a hinge 34. The housing 12, the cover plate 56, and each of the other parts of the retractable emergency light 10 can be crafted from any suitable material within the scope of the present invention including metal or plastic.

In the embodiment of FIGS. 6 and 7, the drive assembly is founded on a motor 54, which can comprise an ac motor or a dc motor. The motor 54 can be secured to the false bottom plate 26, such as by two screws 62 or any other fastening means. The motor 54 can drive a primary gear 32 that, in turn, can drive a secondary gear 30. The primary and secondary gears 32 and 30 can have any necessary gear ratio to ensure a smooth extension and retraction of the light source 24 during operation of the motor 54. The primary and secondary gears 32 and 30 can be disposed between the false bottom plate 26 and the bottom wall 22 of the housing 12.

A drive screw 40 can have a proximal end concentrically mounted to the secondary gear 30 for rotation therewith and a body portion threadedly engaged with a lens base 48 of the light source 24. The drive screw 40 can be rotatably retained in relation to the false bottom plate 26 by a bushing 36 in combination with a bushing washer 38. A guide member 42 can maintain the orientation and alignment of the light source 24 in relation to the housing 12. A limit switch 46 can be disposed on a limit switch mount 44 to sense, for example, a full extension or full retraction of the light source 24. Of course, numerous other drive assemblies may occur to one skilled in the art after reading this disclosure.

So arranged, the drive assembly can drive the light source 24 between the extended position shown, by way of example, in FIG. 7 and the retracted position shown, for example, in FIG. 6. To do so, the motor 54 can induce a rotation of the primary gear 32, which can drive the secondary gear 30. A rotation of the secondary gear 30 will induce a rotation of the drive screw 40. The threaded engagement of the drive screw 40 in relation to the lens base 48 will induce axial movement of the lens base 48 and the light source 24 in general. Rotation of the motor 54, the gears 30 and 32, and the drive screw 40 in a first direction will induce an extension of the light source 24 while rotation in a second, opposite direction will induce a retraction of the light source 24. Again, the limit switch 46 can sense the full extension or the full retraction of the light source 24 to trigger a stoppage of the motor 54.

The light source 24 in the present embodiment is founded on the lens base 48. The lens base 48 retains a lens 66 by a threaded engagement therebetween. The lens 66 is translucent or transparent and is generally annular in cross section such that it essentially comprises a tubular rod with a proximal end retained by the lens base 48, a closed distal end, and an open inner volume. Two bulb sockets 50 are disposed within the open inner volume of the lens 66. The lens 66 can retain two lamps 52 that receive power through wiring 64, which can comprise low voltage wiring.

The light source 24 can utilize a wide variety of lamp variations. In certain embodiments, each lamp 52 can comprise a small bi-pin lamp, such as an LED, a halogen lamp, an incandescent lamp, a strobe-type flashing lamp, or any other effective lamp arrangement. The lens 66 can be constructed of plastic, glass, or any other suitable material. In certain embodiments, the lens 66 can be provided with emergency arrows, emergency insignias, or the like for safe egress.

As FIGS. 1 through 4 show, a reflector 76 can be disposed within the open inner volume of the lens 66 for directing and possibly focusing light emitted by the lamps 52. In the present example, the reflector 76 has a proximal end fixed to the lens base 48. The surface of the reflector 76 facing the lamps 52 can be mirrored by any appropriate method and can be concave or otherwise contoured to guide light emitted by the lamps 52 in a desired manner.

Figure 10:
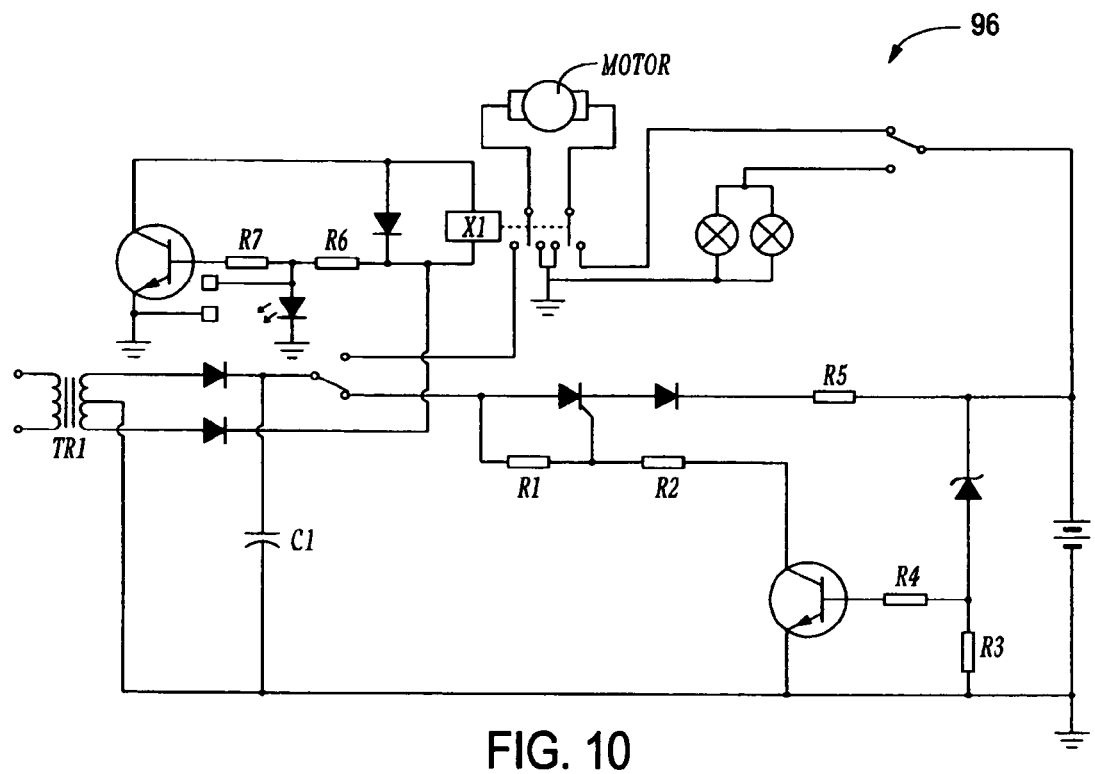
FIG. 10 is a schematic of an electrical circuit pursuant to the instant invention.

With additional reference to FIG. 10, one sees that the operation of the emergency light 10 can be controlled by a control circuit 96, which can be disposed on a circuit board 72 as in FIG. 8. The circuit board 72 can be retained in relation to the housing 12 by a three-sided retaining channel 90, which can be of plastic or any other suitable material. The circuit board 72 can, among other things, act as a means for sensing or receiving a signal regarding an activating condition.

Of course, numerous activating conditions are possible within the scope of the invention. For example, the circuit board 72 can sense an activating condition in the form of an absence of alternating current, which would be indicative of a power failure. The circuit board 72 can switch to a backup battery 70 in response to the loss of alternating current and can effect an engagement of the motor 54 to induce the gears 30 and 32 and the drive screw 40 into operation thereby to drive the light source 24 from its retracted position to its extended position. The backup battery 70 can be retained in relation to the housing 12 by a retaining bracket 70, which can be crafted from plastic or the like. The circuit board 72 or other means can send illuminating power through the wiring 64 to the light source 24 immediately or upon its reaching a fully extended position.

Still further, the circuit board 26 or another means can sense a termination of the activating condition, such as the restoration of alternating current, to induce a reengagement of the motor 54 to drive the light source 24 to a retracted position. The circuit board 72 or another means can terminate power flow to the light source 24 in response to a given event, such as the departure of the light source 24 from the fully extended position or when the light source 24 reaches a fully retracted position or a predetermined position.

Figure 1:
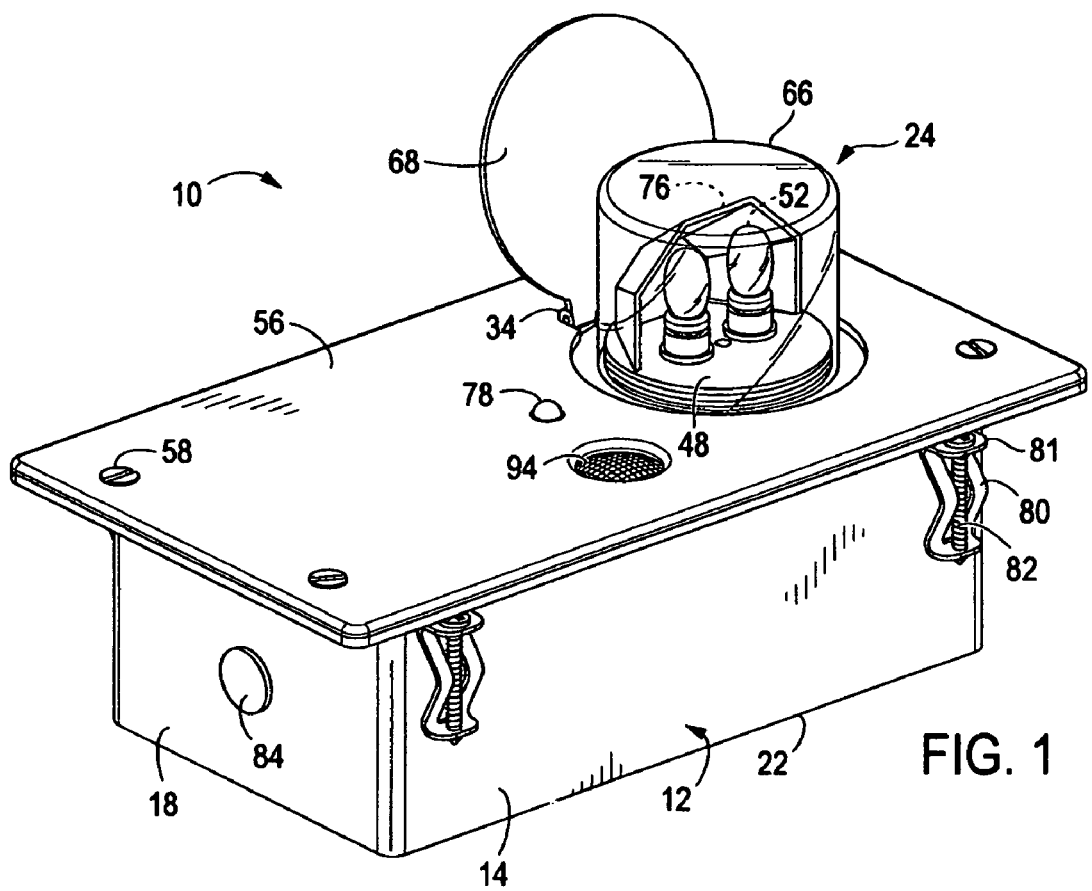
FIG. 1 is a perspective view of a retractable emergency light according to the present invention in an extended disposition.
Figure 2:
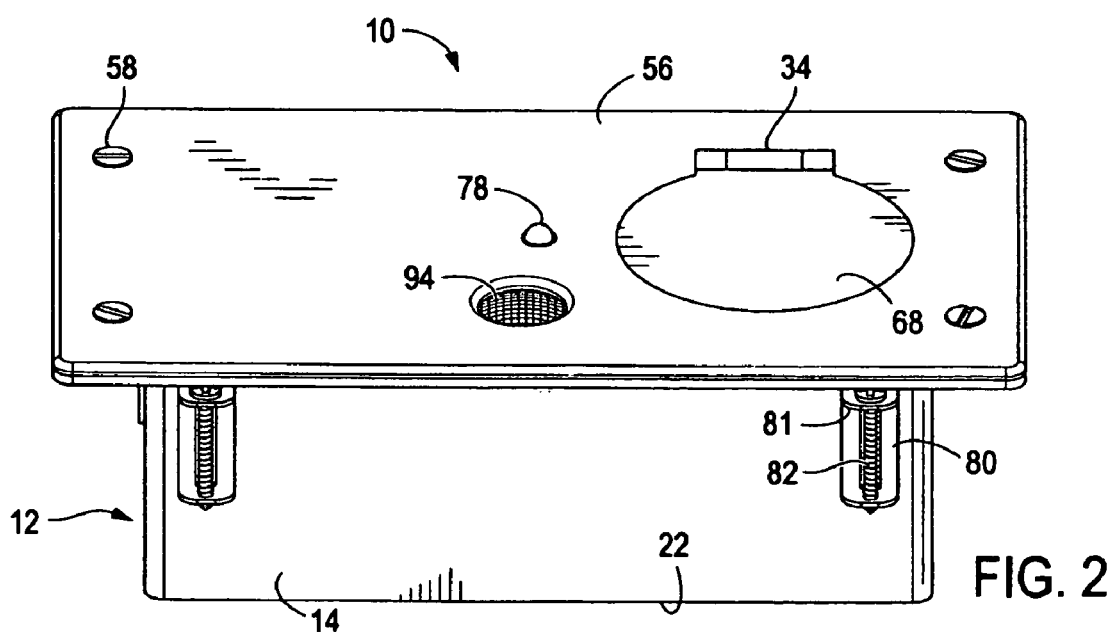
FIG. 2 is a perspective view of the retractable emergency light in a retracted disposition.
Figure 3:
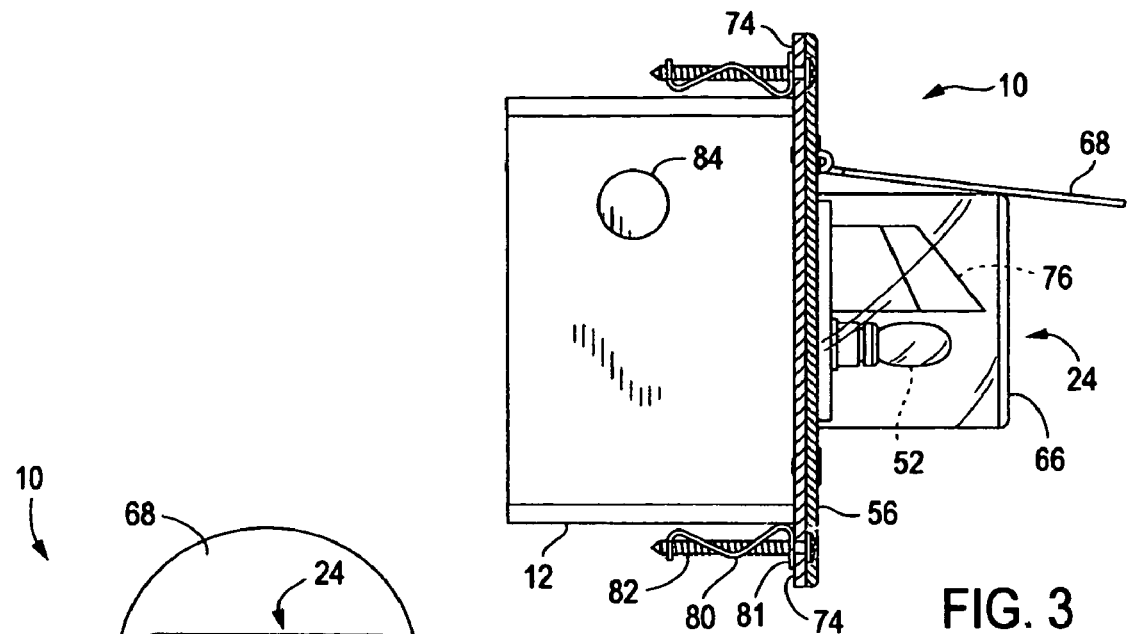
FIG. 3 is a view in side elevation of the retractable emergency light in an extended disposition.
Figure 4:
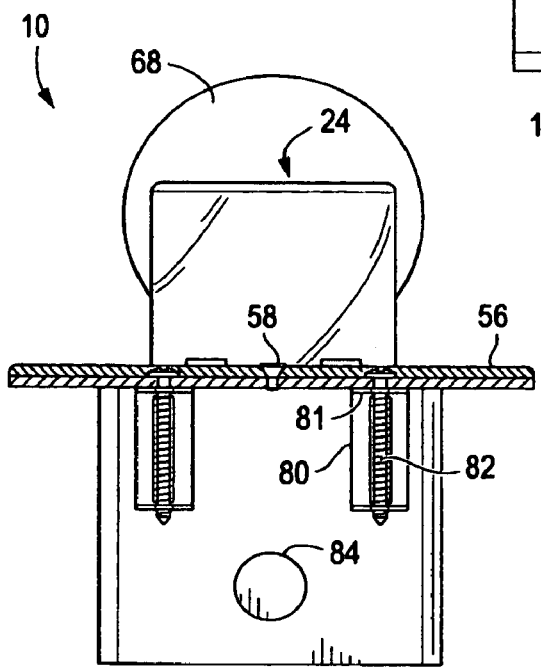
FIG. 4 is a top plan view of the retracted emergency light in an extended disposition.
Figure 5:
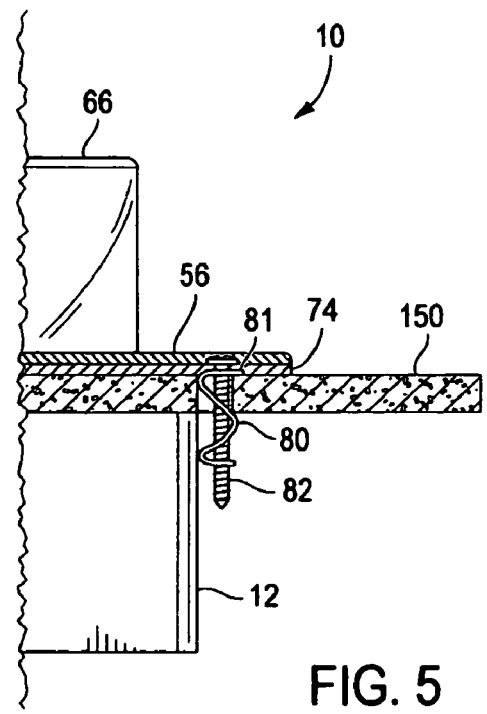
FIG. 5 is a view in side elevation of a section of a retractable emergency light according to the present invention shown mounted relative to a support surface.

Of course, the emergency light 10 could be constructed such that other activating conditions could induce an extension and activation of the light source 24. For example, the emergency light 10 can be activated in response to a sensed alarm condition within a building structure. Numerous alarm conditions are certainly possible including a fire alarm signal, a carbon monoxide alarm signal, a security alarm signal, or any other alarm signal. As FIGS. 1 and 2 show, the emergency light 10 itself can incorporate a sensor 94, which can be a smoke detecting sensor, a carbon monoxide sensor, or any other type of sensor.

Furthermore, the emergency light 10 can incorporate an indicator light 78, which can provide an indication of proper functioning of the emergency light 10, such as by being continuously on or by blinking, and a lack of proper function of the emergency light 10, such as a loss in power either in the backup battery 70 or from a source of alternating current. While a separate button (not shown) could be provided, the indicator light 78 can additionally serve as a test button to enable a periodic testing of the extension, retraction, and lighting capabilities of the emergency light 10.

The emergency light 10 can thus be mounted in relation to a wall, a ceiling, or any other support surface 150 to be extendable and retractable by the mechanical drive assembly. The housing 12 of the emergency light 10 can be mounted in a substantially flush relationship relative to a support surface 150. In the event of a power failure or other activating condition, the motor 54 engages and drives the gears 30 and 32 and the gears 30 and 32 turn the drive screw 40 thereby extending the light source 24 from its concealed position. As the light source 24 is extended, the lens cover 68 can pivot about its hinge 34 to enable the extension of the light source 24. Either immediately or when the light source 24 reaches a fully extended position, the lamps 52 can be illuminated either by power from the backup battery 70 or from a source of alternating current thereby to illuminate, among other things, a path of egress for building occupants. When the activating condition ceases, the lamps 52 can be extinguished, the motor 54 can engage and drive the gears 30 and 32, and the gears 30 and 32 can turn the drive screw 40 thereby retracting the light source 24 to its original position generally flush with the support surface 150.

Figure 11:
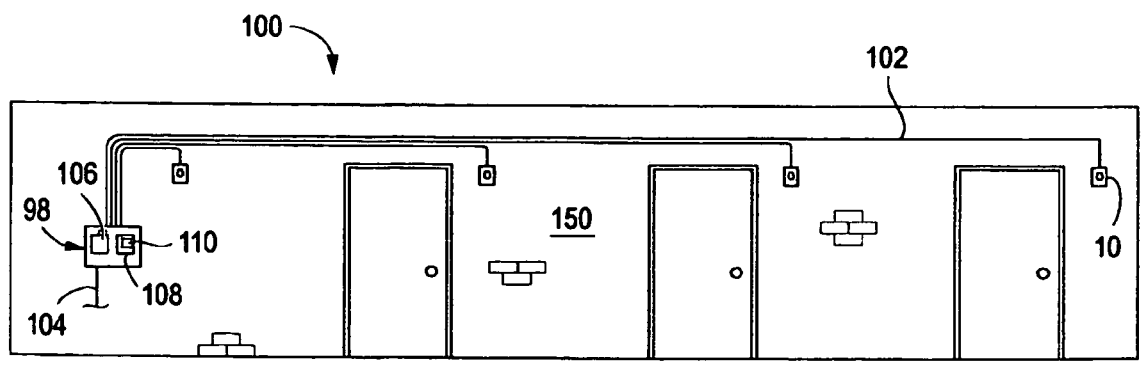
FIG. 11 is a schematic view of an emergency light system as disclosed herein.

In certain practices of the invention, an emergency lighting arrangement 100 employing a plurality of emergency lights 10 can be created in relation to a building structure as is depicted in FIG. 11. There, a plurality of emergency lights 10 are mounted in relation to a support surface 150, which in this example comprises a hallway wall. Emergency lights 10 could be disposed throughout a building where necessary or desirable. Emergency lights 10 could additionally or alternatively be disposed in relation to ceiling and other support surfaces. The emergency lights 10 could be operably associated with a central control unit 98. The emergency lights 10 can be electrically associated with one another and the central control unit 98 by unit wiring 102, which can transmit power and control and alarm signals therebetween. To enable a receipt of the unit wiring 102, each emergency light 10 can have one or more removable members 84, which can be disk shaped, integrated into the housing 12 as is shown, for example, in FIGS. 1 through 4. Additionally or alternatively, wireless communication means can enable control and communication between the central control unit 98 and the emergency lights 10. Central wiring 104 can provide power and possibly communication to and between the central control unit 98 and the emergency lights 10.

Where the emergency lights 10 receive electrical power from the central control unit 98, the backup batteries 70 could be foregone from the individual emergency lights 10 thereby enabling a simpler and more compact construction thereof and a reduction in necessary maintenance. A backup battery 106 could be incorporated into the central control unit 98 for providing emergency power to the emergency lights 10 through the unit wiring 102 where alternating current is unavailable through the central wiring 104. Similarly, where a central control circuit 110 is provided on a central circuit board 108, the individual circuit boards 72 and control circuits 96 could be eliminated, and control signals could be provided to all emergency lights 10 through the central circuit board 108. With this, the individual emergency lights 10 could be further simplified and rendered still more compact.

With a plurality of exemplary embodiments and details of the present invention for an extendable and retractable emergency light 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as a means for performing a specific function, at times without the recital of structure or material. As the law demands, these claims shall be construed to cover not only the corresponding structure and material expressly described in this specification but also all equivalents thereof.

We claim as deserving the protection of Letters Patent:

1. An emergency light for providing illumination during emergency conditions, the emergency light comprising:
    a housing with an open inner volume, a rear portion, and a front portion;
    at least one flange that projects from the front portion of the housing;
    a light source retained relative to the housing wherein the light source is moveable between retracted and extended position;
    a drive arrangement for diving the light source between a retracted position at least partially disposed within the open inner volume of the housing and an extended position wherein the light source projects at least partially from the housing; and
    at least one fastening arrangement operably associated with the housing for retaining the emergency light in relation to a support surface wherein the at least one fastening arrangement comprises a mounting bolt in combination with a locking clip wherein a proximal end of each of the mounting bolt and the locking clip is retained adjacent to the front portion of the housing and wherein a distal portion of the mounting bolt is threadedly engaged with a distal portion of the locking clip whereby a rotation of the mounting bolt will draw the distal portion of the locking clip toward the proximal portion of the locking clip thereby enabling the locking clip to retain the emergency light in relation to the support surface;
    whereby the emergency light can provide lighting during emergency conditions.

2. A emergency light for providing illumination during emergency conditions, the emergency light comprising;
    a housing with an open inner volume;
    a light source retained relative to the housing wherein the light source is moveable between retracted and extended position; and
    a drive arrangement for driving the light source between a retracted position at least partially disposed within the open inner volume of the housing and an extended position wherein the light source projects at least partially from the housing wherein the drive arrangement comprises a motor in combination with a drive screw, wherein the light source comprises a body portion and at least one lamp retained relative to the body portion, and wherein the drive screw is threadedly engaged with the body portion of the light source whereby a rotation of the drive screw by the motor will induce an axial movement of the light source between extended and retracted positions;

whereby the emergency light can provide lighting during emergency conditions.

3. The emergency light of claim 2 wherein the housing is substantially rectangular in cross section with a first end wall, a second end wall opposite the first end wall, a first sidewall, a second sidewall opposite the first sidewall, and a bottom wall and further comprising a false bottom plate retained in spaced relation relative to the bottom wall of the housing and wherein the false bottom plate spans from adjacent to the first end wall to adjacent to the second end wall and wherein at least a portion of the drive arrangement is disposed between the bottom wall of the housing and the false bottom plate.

4. The emergency light of claim 2 wherein the housing has rear portion and front portion and further comprising at least one flange that projects from the front portion of the housing.

5. The emergency light of claim 4 wherein the at least one flange is removable and replaceable in relation to the housing.

6. The emergency light of claim 4 further comprising at least one fastening arrangement operably associated with the housing for retaining the emergency light in relation to a support surface.

7. The emergency light of claim 2 wherein the housing has a rear portion defined by a bottom wall and a front portion and further comprising a false bottom plate retained in spaced relation relative to the bottom wall and wherein the motor is drivingly associated with the drive screw by a gearing arrangement comprising a primary gear and a secondary gear, wherein the gearing arrangement is disposed between the false bottom plate and the bottom wall, and wherein the drive screw is drivingly engaged with the gearing arrangement.

8. The emergency light of claim 2 further comprising a limit switch for sensing a relative disposition of the light source.

9. The emergency light of claim 2 wherein the light source further comprises a lens coupled to the body portion of the light source, wherein the lens and the body portion together define an open inner volume of the light source, and where the at least one lamp is disposed within the open inner volume of the light source.

10. The emergency light of claim 9 further comprising a reflector with a mirrored portion retained relative to the light source for directing light emitted by the at least one lamp.

11. The emergency light of claim 2 further comprising a control circuit operably associated with the motor and the light source for controlling an operation of the motor and an illumination of the light source.

12. The emergency light of claim 11 further comprising a backup battery electrically associated with the control circuit, the motor, and the light source, further comprising a means for electrically coupling the emergency light to an external power source and wherein the control circuit includes a means for inducing an extension of the light source in response to a failure in the external power source.

13. The emergency light of claim 2 further comprising an emergency condition sensor operably associated with the light source and the drive arrangement and further comprising a means for triggering an extension and illumination of the light source in response to an emergency condition.

14. The emergency light of claim 2 further comprising an indicator light for providing an indication of a functional status of the emergency light.

15. A emergency lighting arrangement for providing illumination during emergency conditions, the emergency lighting arrangement comprising:

a plurality of emergency lights for being mounted in relation to support surfaces, each emergency light comprising:

a housing with an open inner volume;

a light source retained relative to the housing; and a drive arrangement for driving the light source between a retracted position at least partially disposed within the open inner volume of the housing and an extended position wherein the light source projects at least partially from the housing wherein the drive arrangement of each emergency light comprises a motor in combination with a drive screw, wherein the light source of each emergency light comprises a body portion and at least one lamp retained relative to the body portion, and wherein the drive screw of each emergency light is threadedly engaged with the body portion of the light source whereby a rotation of the drive screw by the motor will induce an axial movement of the light source between extended and retracted positions;

whereby the emergency light can provide lighting during emergency conditions;

a central control unit; and a means for providing communication between the central control unit and each of to emergency lights.

16. The emergency lighting arrangement of claim 15 wherein the means for providing communication between the central control unit and each of the emergency lights comprises a wiring arrangement.

17. The emergency lighting arrangement of claim 16 wherein the wiring arrangement further comprises a means for providing power from the central control unit to each of the emergency lights.

18. The emergency lighting arrangement of claim 17 further comprising a backup battery in electrical association with the central control unit for providing emergency power to the emergency lighting arrangement.

19. The emergency lighting arrangement of claim 15 wherein the housing of each emergency light has a rear portion and a front portion and wherein the housing of each emergency light further comprises at least one flange that projects from the front portion of the housing wherein the at least one flange is removable and replaceable in relation to the housing.

20. The emergency lighting arrangement of claim 15 wherein the housing of each emergency light has a rear portion and a front portion, wherein the housing of each emergency light further comprises at least one flange that projects from the front portion of the housing, and wherein each emergency light further comprises at least one fastening arrangement operably associated with the housing for retaining the emergency light in relation to a support surface wherein the at least one fastening arrangement comprises a mounting bolt in combination with a locking clip wherein a proximal end of each of the mounting bolt and the locking clip is retained adjacent to the front portion of the housing and wherein a distal portion of the mounting bolt is threadedly engaged with a distal portion of the locking clip whereby a rotation of the mounting bolt will draw the distal portion of the locking clip toward the proximal portion of the locking clip thereby enabling the locking clip to retain the emergency light in relation to the support surface.

21. The emergency lighting arrangement of claim 15 further comprising a control circuit operably associated with the central control unit.

22. The emergency lighting arrangement of claim 15 further comprising an emergency condition sensor operably associated with the emergency lights and further comprising a means for triggering an extension and illumination of the lights sources of the emergency lights in response to an emergency condition.

* * * * *